US007829844B2

(12) United States Patent
Miyata et al.

(10) Patent No.: US 7,829,844 B2
(45) Date of Patent: Nov. 9, 2010

(54) SUBSTRATE FOR MASS SPECTROMETRY, AND METHOD FOR MANUFACTURING SUBSTRATE FOR MASS SPECTROMETRY

(75) Inventors: Hirokatsu Miyata, Hadano (JP); Kazuhiro Yamauchi, Tokyo (JP); Kimihiro Yoshimura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 437 days.

(21) Appl. No.: 11/775,539

(22) Filed: Jul. 10, 2007

(65) Prior Publication Data

US 2008/0135781 A1 Jun. 12, 2008

(30) Foreign Application Priority Data

Jul. 11, 2006 (JP) ............................ 2006-190418

(51) Int. Cl.
*B01D 59/44* (2006.01)
*H01J 49/26* (2006.01)
*B01D 71/02* (2006.01)

(52) U.S. Cl. ...................................... 250/288; 250/284

(58) Field of Classification Search ................. 250/281, 250/282, 283, 284, 288; 216/41, 42, 43, 216/44, 2, 39, 47, 48, 51; 438/48, 85, 104, 438/409

See application file for complete search history.

(56) References Cited

U.S. PATENT DOCUMENTS

| | | | | |
|---|---|---|---|---|
| 6,399,177 | B1 | 6/2002 | Fonash et al. | 428/119 |
| 6,565,763 | B1 | 5/2003 | Asakawa et al. | 216/56 |
| 7,090,784 | B2 | 8/2006 | Asakawa et al. | 216/41 |
| 7,097,781 | B2 | 8/2006 | Asakawa et al. | 216/56 |
| 7,122,790 | B2 * | 10/2006 | Fonash et al. | 250/288 |
| 7,688,056 | B2 * | 3/2010 | Murata | 324/76.11 |
| 2003/0031615 | A1 * | 2/2003 | Satou et al. | 423/335 |
| 2006/0214101 | A1 * | 9/2006 | Takahashi et al. | 250/288 |
| 2006/0231525 | A1 | 10/2006 | Asakawa et al. | 216/56 |
| 2009/0124034 | A1 * | 5/2009 | Niu et al. | 438/49 |

FOREIGN PATENT DOCUMENTS

| | | |
|---|---|---|
| JP | 2001-151834 | 6/2001 |
| WO | WO 2004/099068 A2 | 11/2004 |

OTHER PUBLICATIONS

Wei et al., "Desorption-ionization mass spectrometry on porous silicon", Nature, 399, 243-246, May 1999.
Joseph D. Cuiffi et al., "Desorption-Ionization Mass Spectrometry Using Deposited Nanostructured Silicon Films," Analytical Chemistry, American Chemical Society, vol. 73, No. 6, Mar. 15, 2001, pp. 1292-1295.
S. Okuno et al., "Requirements for Laser-Induced Desorption/Ionization on Submicrometer Structures," Analytical Chemistry, American Chemical Society, vol. 77, No. 16, Sep. 15, 2005, pp. 5364-5369.
European Search Report issued in the corresponding application No. 07013123.0 dated Jun. 28, 2010—9 pages.

* cited by examiner

*Primary Examiner*—Jack I Berman
*Assistant Examiner*—Nicole Ippolito Rausch
(74) *Attorney, Agent, or Firm*—Fitzpatrick, Cella, Harper & Scinto

(57) ABSTRACT

A substrate for mass spectrometry for effectively performing ionization has been demanded. The substrate for mass spectrometry includes a base, a porous film formed on the base, and an inorganic material film formed on the porous film. The inorganic material film has a plurality of concaves formed vertically to the base, and the diameter of the concaves is not less than 1 nm and less than 1 μm.

6 Claims, 5 Drawing Sheets

SUBSTRATE FOR MASS SPECTROMETRY, AND METHOD FOR MANUFACTURING SUBSTRATE FOR MASS SPECTROMETRY

BACKGROUND OF THE INVENTION

1. Field of the Invention

The present invention relates to a substrate used for mass spectrometry, particularly, to a substrate used for mass spectrometry based on the laser desorption ionization method.

2. Description of the Related Art

Mass spectrometry has long been used as one means for identification of substances, particularly organic substances. The principle thereof is to impart a large energy in a short time to a sample to ionize it and analyze the mass of the ion by a detector. As a detector, a quadrupole mass spectrometer, a time-of-flight mass spectrometer and the like are used. Particularly, the time-of-flight mass type detector is recently becoming mainstream. As an energy source to cause ionization, a Curie point pyrolyzer and a laser are used. Although mass spectrometry is favorably used for analysis of low-molecular substances, if an object substance to be measured has a high molecular weight, the original substance has a tendency of being fragmentated and decomposed into relatively low-mass ions. Then, means is proposed to apply the mass spectrometry to detection of materials having a high molecular weight like biomolecules. This means is named Matrix Assisted Laser Desorption Ionization Mass spectrometry (MALDI-MS). This is means which can ionize even a substance having a high molecular weight while preventing the fragmentation by making a mixture of the object substance to be detected and a material named a matrix to be a sample and subjecting the sample to the laser irradiation. Through the spectroscopic method of MALDI-MS, the mass spectrometry has been given attention as evaluation and identification means of biomaterials.

Means is also proposed to conduct mass spectrometry using a porous substrate instead of a matrix material. This method is named Surface Assisted Laser Desorption Ionization Mass Spectrometry (SALDI-MS). Since this method detects no low-molecular peak resulting from a matrix, it is said to be advantageous to the mass spectrometry of relatively low-molecular biomaterials such as metabolites. Techniques using a substrate having a semiconductor porous surface for mass spectrometry are disclosed in U.S. Pat. No. 6,288,390 and U.S. Pat. No. 6,399,177. Particularly a technique related to SALDI-MS using a porous silicon fabricated by anodic conversion of silicon is named Desorption Ionization on Silicon (DIOS), and is disclosed, for example, in Jing Wei, et al., Nature, Vol. 399, pp. 243-246, 1999.

Although MALDI-MS can ionize an analytical object while preventing fragmentation thereof, since the sample is mixed with a matrix material for measurement, MALDI-MS has a problem that mass peaks resulting from the matrix material are observed in large numbers.

On the other hand, since DIOS generates almost no low-molecular MS peaks resulting from a matrix and can prevent fragmentation of a substance to be detected, a high-quality spectrum is obtained.

However, in the case (U.S. Pat. No. 6,399,177) of a porous silicon formed directly on a silicon substrate having a high thermal conductivity, the energy absorbed in the silicon by laser irradiation easily transfers to the silicon substrate. As a result, there arises a problem that the efficiency of the local temperature rise of porous parts carrying a substrate to be detected is reduced.

Therefore, the present invention has an object to provide a substrate for mass spectrometry whose efficiency of temperature rise is enhanced.

SUMMARY OF THE INVENTION

The substrate for mass spectrometry according to the present invention is characterized by including a base, a porous film formed on the base and an inorganic material film formed on the porous film, and the inorganic material film is characterized by having a plurality of concaves formed vertically to the base, the diameter of which concaves is not less than 1 nm and less than 1 μm.

The manufacturing method of a substrate for mass spectrometry according to the present invention is characterized by including forming a porous film on a base, forming an inorganic material film on the porous film and forming a plurality of concaves of not less than 1 nm and less than 1 μm in diameter on the surface of the inorganic material film vertically to the base.

The present invention provides a substrate for mass spectrometry which smoothly causes the desorption process because the efficiency of the temperature rise can be enhanced since the substrate has a porous film.

Further features of the present invention will become apparent from the following description of exemplary embodiments with reference to the attached drawings.

DESCRIPTION OF THE EMBODIMENTS

Hereinafter, exemplary embodiments of the present invention will be described.

Figure 1A:
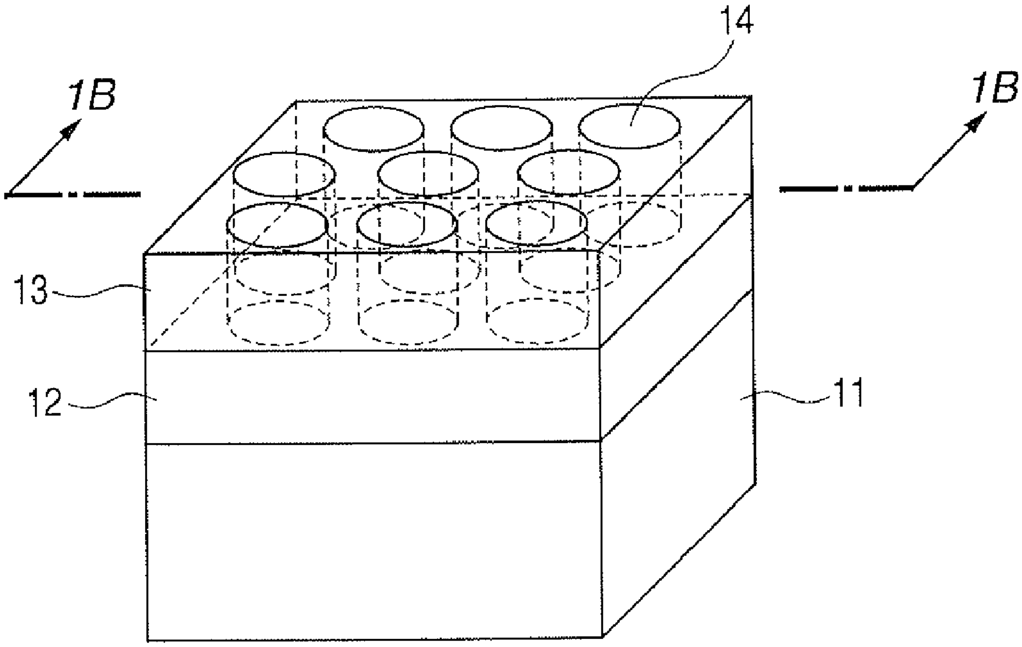
FIGS. 1A and 1B are illustrative views of a substrate for mass spectrometry according to the present invention on whose surface fine concaves are formed.
Figure 1B:
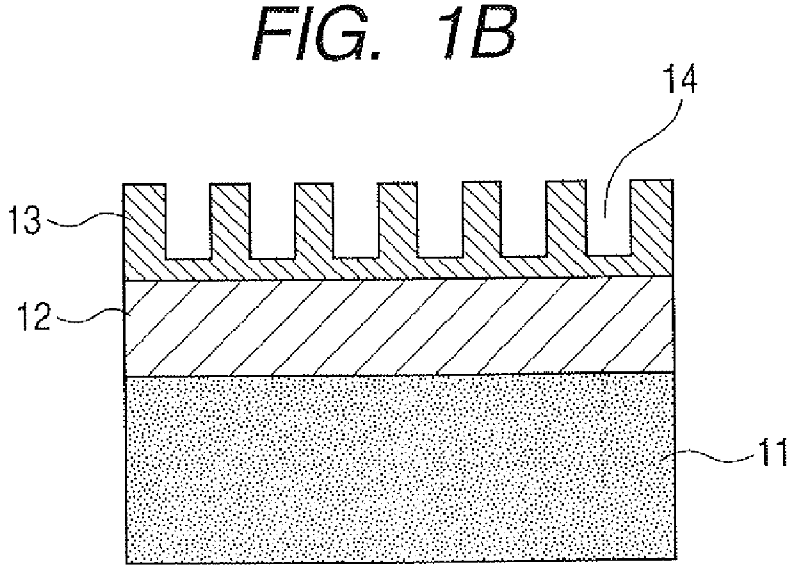

A typical constitution of the substrate for mass spectrometry according to the present invention is illustratively shown in FIGS. 1A and 1B.

The substrate for mass spectrometry according to the present invention has a base 11, a porous film 12 of a porous substance formed on the base 11 and an inorganic material film 13 formed on the porous film 12. The material of the base 11 is not especially limited as long as withstanding fabrication processes of a porous film and an inorganic material film described later, and can be common materials. The examples include glass, ceramics and metals.

Then, the porous film 12 of a porous substance formed on the base 11 will be described. Substances containing silicon as a component and inorganic substances such as oxides are favorably used as the porous substance, but the porous substance is not limited thereto; as an oxide, silica, titania, tin oxide, silicon dioxide and the like can be used. Porous substances have a low thermal conductivity because having pores, and enhance the effect of enclosing heat in an inorganic material film. This enables a sample carried on the inorganic material film to be efficiently ionized. Further, there is also a demand for the porous film 12 to be such that a film of an inorganic material described later can be continuously and flatly formed on the porous film.

As a porous film, a thin film of a mesoporous material can be especially used which is fabricated by removing an organic component (surfactant) from an organic-inorganic composite formed with clusters of the surfactant made to be a template. The mesoporous material can be formed as a favorable continuous film on a base by a simple process such as the sol-gel method. A material of a porous substance to be favorably used contains silicon in view of the cost and the easiness of the process, and silica can be especially used. Fabrication methods of mesoporous silica thin films are disclosed in some documents, for example, Advanced Functional Materials, Vol. 14, p. 311 and Current Opinion in colloid & Interface Science, Vol. 4, p. 420.

A mesoporous silica thin film can be fabricated by various methods, such as means including dip coat, spin coat and mist coat based on the sol-gel method described before and means based on the inhomogeneous nucleus generation-nucleus growth on a base. In the present invention, fabrication methods are not especially limited as long as they can form a continuous film having a flat surface and few generated cracks. In the mesoporous material described above, since pores are formed with clusters of surfactant molecules made to be a template, and the sizes of the molecular clusters are uniform, a porous substance having a substantially uniform pore size is formed. Some methods are known which remove the surfactant from the pores to make porousness, and include, for example, baking, ultraviolet irradiation, oxidative removal by ozone, extraction by a solvent and extraction by a supercritical fluid. In the present invention, any of these methods may be used.

In the substrate for mass spectrometry according to the present invention, the porous film 12 can have at least one diffraction peak in the angular region corresponding to the structural period of not less than 1 nm in the X-ray diffraction analysis. The fine porous structure of the mesoporous silica can be optional. Usable examples are mesoporous silicas having a two-dimensional hexagonal structure including tubular pores, and a cubic structure and a three-dimensional hexagonal structure including spherical pores.

Then, in the substrate for mass spectrometry according to the present invention, the inorganic material film 13 formed on the porous film 12 described above will be described. Formation methods of the inorganic material film can use various vacuum deposition methods, but are not necessarily limited thereto. As a vacuum deposition method, methods such as resistance heating vacuum deposition, electron beam deposition, sputtering, arc deposition and chemical vapor deposition (CVD) can be used. Materials for an inorganic material used for the inorganic material film 13 are not especially limited, but semiconductors and metals can be especially used. The semiconductors include silicon, germanium and oxide semiconductors, but in the present invention, silicon can be especially used. Silicon can be favorably used for any of amorphous silicon films, polycrystalline silicon films and the like, and an optimum means is used out of the plasma CVD, low-pressure CVD and the like depending on the purposes. Here, a film formation method may be selected so that the base 11 to be used and the porous film of a porous substance formed on the base are not adversely affected by the formation process of the inorganic material film. If exemplified, in the case of formation of an amorphous silicon film, for example, the high-frequency plasma CVD method can be used. In the case of formation of a low-temperature polysilicon film, for example, the plasma CVD can be used. In the present invention, there are especially no limitations on the form, structure, film formation method and the like of silicon used for the inorganic material film, and an optimum material is formed as a film by an optimum method depending on the purposes. The thickness of silicon has also no limitation, but too thick a silicon thickness reduces the effect on the thermal block by the porous film underneath the inorganic material film, which will be described later. By contrast, too thin a silicon thickness sometimes raises problems that the laser energy cannot be efficiently absorbed, that decomposition of a substance to be detected in the ionization process by the laser irradiation cannot be prevented, and the like. Therefore, the thickness can be optimized depending on the material.

On the other hand, when a metal is used as an inorganic material used for the inorganic material film 13, a relatively common metal can be used. Examples include iron, nickel, chromium, copper, silver, gold, platinum and palladium. Here, when a material which is relatively easily oxidized in the air is used for a substrate for mass spectrometry, if required in consideration of formation of an oxide, a treatment such as removal of the oxide layer is sometimes necessary. The metal is formed on the porous film 12 by methods such as resistance heating deposition, electron beam deposition, sputtering and arc deposition. A material such as titanium, which improves the adhesiveness of a metal and an underlying layer, may optionally be deposited prior to the film formation of the object metal.

Figure 2A:
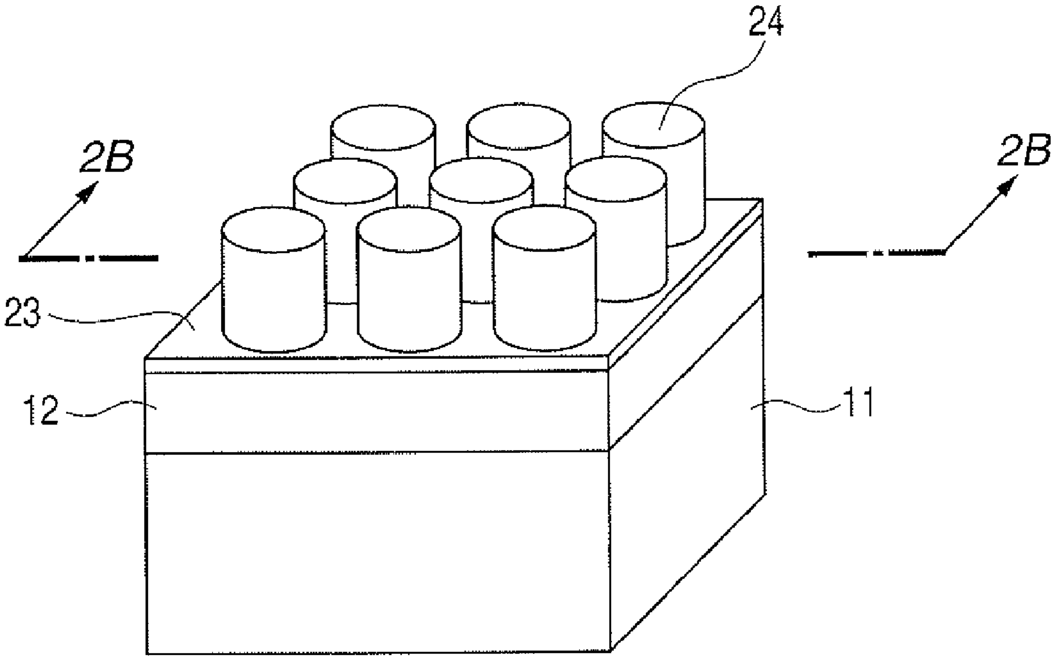
FIGS. 2A and 2B are illustrative views of a substrate for mass spectrometry according to the present invention on whose surface fine convexes are formed.
Figure 2B:
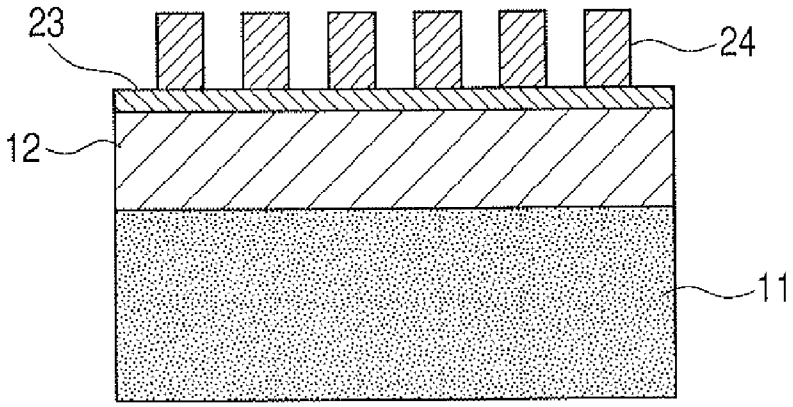

Then, the inorganic material film 13 formed on the porous film 12 in such a way is subjected to a process of forming a plurality of concaves or a plurality of convexes of not less than 1 nm and less than 1 μm in diameter vertically to the base. Here, a substrate for mass spectrometry on which concaves 14 are formed is illustrated in FIGS. 1A and 1B; and a substrate for mass spectrometry on which convexes 24 are formed is illustrated in FIGS. 2A and 2B. As a result of extensive studies on the irregular structures formed on a base, the present inventors have confirmed that the case where the concaves or convexes have a diameter of not less than 1 nm and less than 1 μm provides a mass spectrum with a favorable sensitivity and with a suppressed fragmentation.

Application of the general-purpose photolithography to the formation of concaves or convexes on an inorganic material film is difficult because their diameter is not less than 1 nm and less than 1 μm. Hence, concaves or convexes of the substrate for mass spectrometry according to the present invention can be fabricated by a process utilizing the self-assembly of a material. However, any process which can form the similar structure can be applied to the fabrication of the substrate for mass spectrometry according to the present invention. A process utilizing the self-assembly of a material can be especially a method whereby a pattern having a microphase separation structure of a block copolymer is transferred to an inorganic material film, and this technique is disclosed, for example, in Japanese Patent Application Laid-Open No. 2001-151834. A method whereby a structure of a block copolymer is transferred to a base will be described below.

A block copolymer means a polymer compound in which a plurality of polymer segments having different properties is bonded by covalent bond. Use of a precise polymerization such as living polymerization allows synthesis of a block copolymer having a very narrow molecular weight distribution, and such a block copolymer is known to generate the microphase separation of components on the nanometer scale. The microphase separation structure is known to be able to take a highly regular structure, and the structure is determined depending on the molecular weight ratio of a plurality of segments contained in a molecule and the degree of the compatibility between the plurality of segments. Examples include a structure in which a secondary component is dispersed in a spherical shape in a matrix of a first component, a structure in which a secondary component is dispersed in a cylindrical shape in a matrix of a first component, and a structure in which a first component and a second component are separated in a lamellar shape. If the magnitude of the molecular weight ratios of the first component and the second component reverses, a structure in which a first component is dispersed in a matrix of a second component is formed. Although the above exemplified structures are found in diblock copolymers including two components, block copolymers having three or more components form more complicate and much diversified structures.

Development of the phase separation structure of a block copolymer can be achieved by a very simple process. For example, a simple process in which a block copolymer dissolved in a solvent is cast on a base, and heated while the solvent is being dried, can cause the microphase separation.

From the microphase separation structure of the block copolymer formed above a base in such a way, a specific component can be selectively removed utilizing the difference in chemical properties between components. By this step, for example, a porous film (i.e., porous film 12) is formed above a base. Structures having a cylindrical shape and a spherical shape can be formed on a base by removing selectively matrix components. In such a way, holes and cylindrical structures vertical to the film surface can be formed.

By using a film of a block copolymer, formed on an inorganic material film in such a way, from which a specific component has been removed, a pattern of the microphase separation structure can be transferred to the inorganic material film. As the simplest case, there is a method whereby the inorganic material film is etched using as a mask a polymer component remaining on the inorganic material film. In this case, the process must be optimized depending on the materials constituting a substrate for mass spectrometry, etching means and a composition of a block copolymer to be used. The problem is the ratio of the etching rates of one polymer component remaining on the inorganic material film and an underlying inorganic material film. In the case where this ratio cannot be made large, deep irregular structures cannot sometimes be formed because the polymer on the inorganic material film is also removed by etching in the stage of a shallow etching of the inorganic material film. In such a case, one component of a block copolymer is not used directly as a mask, but the structure of the block copolymer may be replaced by another material which is largely different in the etching rate from a material comprised in the inorganic material film which is an object of etching. Thereafter, a process can be used in which the inorganic material film is etched using as a mask the another material replaced by in such a way.

These two processes will be in detail described by way of drawings.

A first process will be first described in which a specific component of a phase separation structure of a block copolymer is selectively removed, and an inorganic material film is etched using a remaining component as a mask. The flow of this process is illustrated in FIGS. 3A to 3E.

Figure 3A:
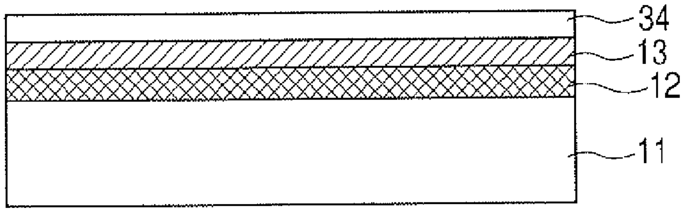
FIGS. 3A, 3B, 3C, 3D and 3E are illustrative views illustrating an example of a manufacturing process of a substrate for mass spectrometry according to the present invention.

As illustrated in FIG. 3A, first, an inorganic material film 13 is formed on a porous film 12 on a base 11, and a block copolymer film 34 is cast on the inorganic material film 13.

Figure 3B:
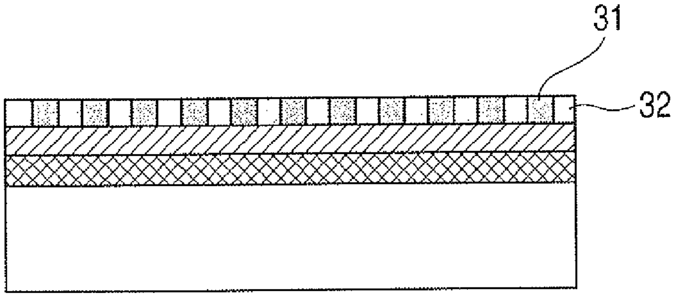

Then, as illustrated in FIG. 3B, a structure illustrated in FIG. 3A is heated to dry a solvent in the block copolymer film and to develop a microphase separation structure of the block copolymer. Thus, the block copolymer is separated as micophases into domains 31 including one component of the block copolymer causing the microphase separation (hereinafter, simply referred to as domains 31) and a matrix 32 including the other component of the block copolymer causing the microphase separation (hereinafter, simply referred to as matrix 32).

Figure 3C:
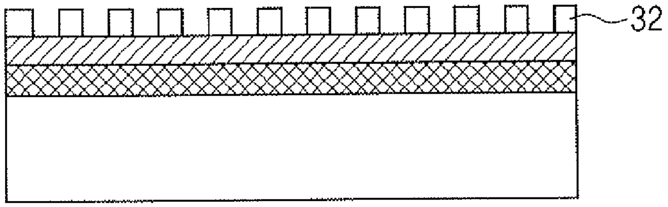

Then, as illustrated in FIG. 3C, the domains 31 are selectively removed by a treatment such as dry etching under certain conditions.

Figure 3D:
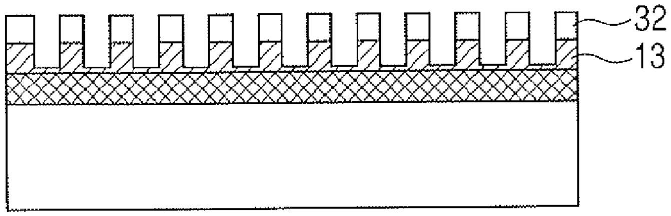

Further, as illustrated in FIG. 3D, by using as a mask the matrix 32 remaining on the inorganic material film 13, the inorganic material film 13 on the base 11 is etched by dry etching or the like under other conditions.

Figure 3E:
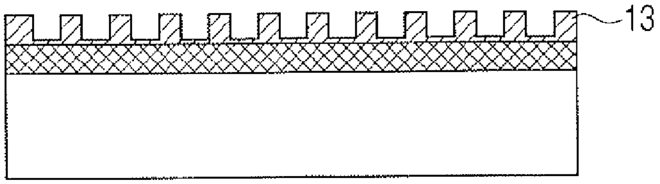

Finally, as illustrated in FIG. 3E, the matrix 32 having been used as a mask is removed.

In this process, for example, by reversing the ratio of the molecular weights in the block copolymer to be used, either of concaves and convexes can be formed on a substrate for mass spectrometry.

Next, a process will be described referring to FIGS. 4A to 4G in which process a structure of a block copolymer is replaced by another material which is largely different in the etching rate from a material which is an object of etching (inorganic material film), and the inorganic material film is etched using the another material as a mask.

Figure 4A:
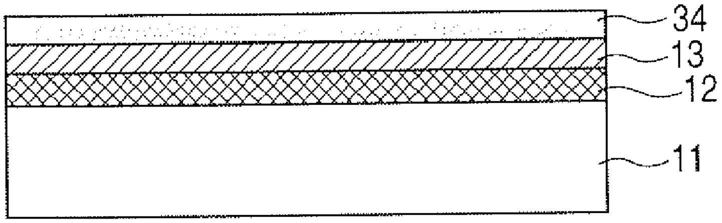
FIGS. 4A, 4B, 4C, 4D, 4E, 4F and 4G are illustrative views illustrating another example of a manufacturing process of a substrate for mass spectrometry according to the present invention.
Figure 4B:
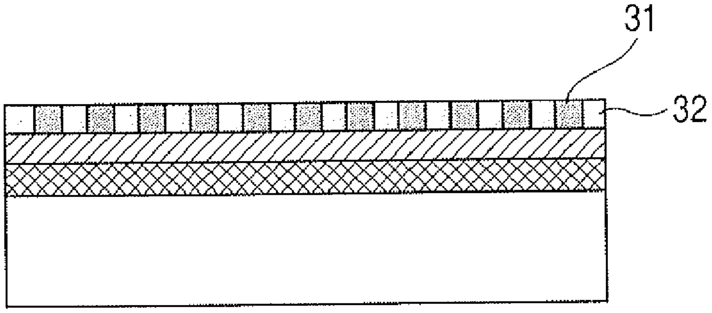
Figure 4C:
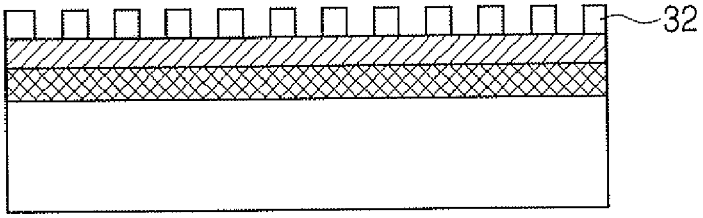

Since the steps of FIGS. 4A to 4C are the same as the steps of FIGS. 3A to 3C in the first process described above, their description is omitted.

Figure 4D:
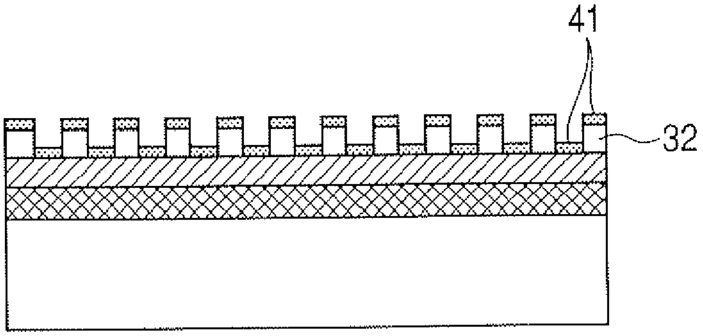

As illustrated in FIG. 4D, after the domains 31 are removed, a mask material 41 having a large etching contrast against the underlying inorganic material film 13 is formed by vapor deposition and the like in the state of the pattern of the polymer being formed on the inorganic material film.

Figure 4E:
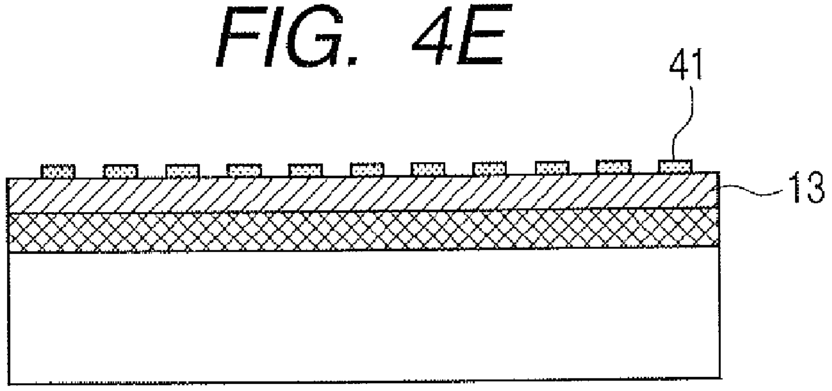

Then, as illustrated in FIG. 4E, the matrix 32 on the inorganic material film and the mask material 41 formed on the matrix 32 are removed.

Figure 4F:
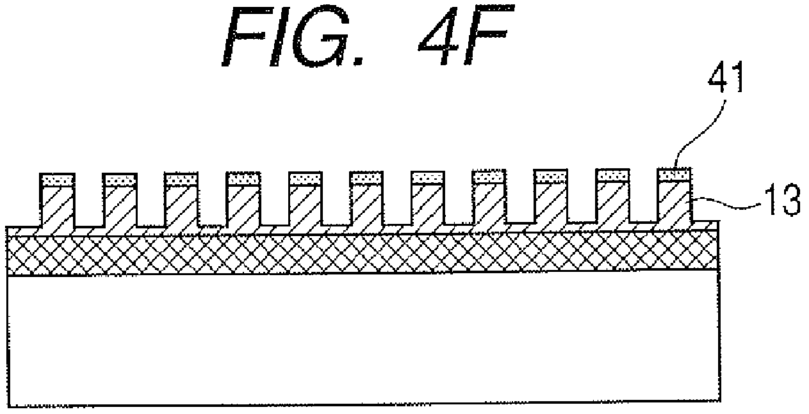

Then, as illustrated in FIG. 4F, the inorganic material film 13 is etched using the mask material 41 as a mask by dry etching and the like under other conditions.

Figure 4G:
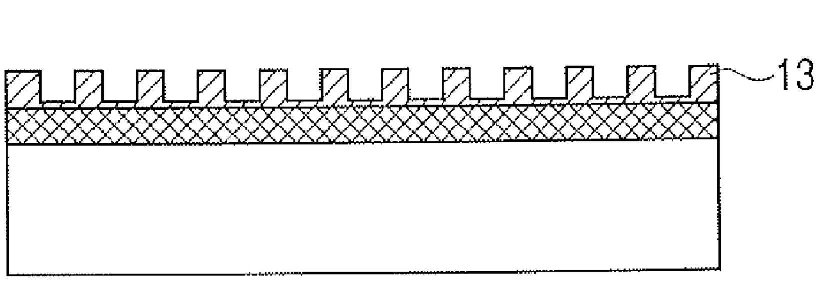

Finally, as illustrated in FIG. 4G, the mask material 41 on the inorganic material film is removed.

The substrate for mass spectrometry according to the present invention may be fabricated using either of the two processes described above. This step is not essential, and the substrate for mass spectrometry can be used in the state that the substance deposited on the surface remains.

These two fabrication processes will be further in detail described.

As a block copolymer used for manufacture of the substrate for mass spectrometry according to the present invention, block copolymers having common compositions can be used. They include, for example, the following, but are not limited thereto.

Polystyrene-polymethyl methacrylate (PS-b-PMMA)

Polystyrene-polyphenyl methacrylate (PS-b-PPhMA)

Polystyrene-polyisoprene (PS-b-PI)

Polystyrene-polybutadiene (PS-b-PB)

A combination of a plurality of components constituting a block copolymer which exhibits a sufficient etching contrast in the etching process described later can be especially used for the first process illustrated in FIGS. 3A to 3E.

The ratio of the molecular weights of the block copolymer has no limitation. For example, if the block copolymer is a diblock copolymer, the ratios including 20/80, 30/70, 80/20 and 70/30 can be used, and may be a ratio therebetween. The microphase separation structure of a block copolymer changes depending on these composition ratios, and a structure in which spherical domains are dispersed and a structure in which cylindrical domains are dispersed are favorably used. However, in a block copolymer having a composition whose phase separation structure exhibits a lamella structure, since the lamella structure is generally formed parallel with a base and the selective removal of one component is almost impossible, application of the block copolymer to the present invention is difficult. Which component out of a plurality of components is made to be a matrix and which one is made to be dispersed domains are suitably selected depending on the surface shape of an object substrate.

Various means are applicable to remove a specific component in a phase separation structure of a block copolymer. For example, in the case of using a block copolymer having a structure containing oxygen as a component of the block copolymer, the means include a method whereby the component containing oxygen is selectively removed by the dry etching using oxygen as an etching gas. In the present invention, a method of selectively removing a component is not especially limited as long as the method can favorably achieve the removal of an object component, and an optimum method is selected depending on a component to be removed.

Then, processes will be described in which an underlying inorganic material film is etched using a block copolymer film after a specific component has been removed. As described above, the processes have two types.

First, a method, which is illustrated in FIGS. 3A to 3E, will be described whereby an inorganic material film is etched using directly as a mask a matrix after a specific component remaining on an inorganic material film has been removed.

Transfer of a pattern of a component separated as microphases of a block copolymer to an inorganic material film commonly uses an etching process. For fabrication of the substrate for mass spectrometry according to the present invention, either of the dry etching and wet etching processes can be used, but the dry etching process often achieves a favorable transfer. However, a process used for fabrication of the substrate for mass spectrometry according to the present invention is not any more limited as long as the process provides a desired shape. For example, when the inorganic material film is silicon, the dry etching using a mixed gas of $SF_6/CHF_3$ uses the matrix 32 as a mask, and the inorganic material film of silicon and the like can be favorably etched. The dry etching, since the directional controllability at etching can be made favorable, can form concaves vertical to the base. If viewed from a structure finally formed, this is also regarded as convexes vertical to the base being formed.

Next, a process, illustrated in FIGS. 4A to 4G, will be described in which a structure of a block copolymer is replaced by another material which is largely different in the etching rate from a material which is an object of etching (inorganic material film), and the inorganic material film is etched using the another material as a mask. With the block copolymer (i.e. matrix 32) after removal of a specific component being left on the inorganic material film, for example, a metal (i.e. mask material 41) is vapor deposited. A deposited substance is not limited to a metal as long as the substance withstands a process described later and can be favorably removed from the inorganic material film after the dry etching. An example of a metal includes chromium.

After the deposition step of the mask material 41, the block copolymer (matrix 32) and the deposited material (mask material 41) formed thereon are removed. This removal step may be performed, for example, by dissolving in a solvent the component of the block copolymer remaining on the inorganic material film and removing it with the solvent. By this step, the deposit (mask material 41 of FIG. 4E) deposited on parts on the inorganic material film where the block copolymer is not present is made to remain. By this step, a deposit pattern having the same shape as the matrix 32 having the phase separation structure of the block copolymer formed on the inorganic material film, is transferred and formed.

Then, by using this pattern, concaves or convexes are formed on the underlying inorganic material film. This step can be performed by the etching process as in the first process described above. Either of processes of dry etching and wet etching may be used for this etching step, but the dry etching process can often achieve a favorable transfer. However, a process used for fabrication of the substrate for mass spectrometry according to the present invention is not any more limited as long as it provides a desired shape. For example, in the case of an inorganic material film of silicon, silicon in the area where the deposited material pattern (mask material 41) is not formed is selectively etched to form concaves by the dry etching using a mixed gas of $SF_6/CHF_3$. This process is more complicated than the method whereby an inorganic material film is etched using a component of a block copolymer (matrix 32) directly as a mask, but can form deep irregularity. This is because a material (mask material 41) largely ratio in the etching rate from the underlying inorganic material film is selected as a deposition material to be transferred from the phase separation structure of the block copolymer.

Lastly, the deposited material used as a mask for etching is subjected to a step of removing it. This step is not an essential one to fabricate the substrate for mass spectrometry according to the present invention. Therefore, if the measurement sample and the mass spectrometry are not adversely affected, the deposited material can be made to remain on the surface. When mass spectrometry is conducted by the surface assisted laser desorption ionization mass spectrometry, there is a case where a higher electric conductivity of the surface provides a more favorable spectrum measurement. Particularly in such a case, there is a case where a more favorable substrate for mass spectrometry can be fabricated by using a metal as a deposition material and using it as it is allowed to remain on the surface. In this case, a conductive material different from a material comprised in the inorganic material film may be on concaves or convexes. For removal of the deposited material, common means are used. Especially using the wet etching allows to simply remove a deposited material. As a substance used for etching, an optimum one is selected depending on the deposited material. For example, in the case of chromium as a deposited material, the chromium can be removed using a cerium ammonium nitrate solution. However, if the material used for the wet etching remains on the substrate for mass spectrometry, the material has a risk of generating a peak derived from a contamination on the mass spectrometry spectrum. Therefore, the substrate for mass spectrometry after the wet etching may optionally be well washed using ultrapure water and the like.

By the steps described above, the substrate for mass spectrometry according to the present invention can be fabricated.

The substrate for mass spectrometry according to the present invention can be used for mass spectrometry using a commercially available MALDI-MS apparatus. The substrate for mass spectrometry according to the present invention is used as a sample stage on which a sample of a measurement object is mounted to conduct mass spectrometry. Here, an additional step of working the surface of the sample stage such that the heights of the surfaces of the sample stage and the substrate coincide may be necessary, and the working step is optionally added.

As described above, according to the present invention, fine irregularity of the nanometer scale can be formed on a substrate without using an electrochemical means using hydrofluoric acid. In the substrate for mass spectrometry according to the present invention, a porous material having a very low thermal conductivity is formed underneath an inorganic material film of silicon and the like. This prevents the energy which the inorganic material film has acquired by absorbing laser from moving into a base and reducing the utilization efficiency of energy, and finally prevents the sensitivity from decreasing.

Since the present invention can dispenses with using silicon wafers, many structures can be formed on a large substrate surface, and substrates for mass spectrometry can be inexpensively manufactured.

EXAMPLES

Hereinafter, the present invention will be further in detail described by way of examples, but the present invention is not limited to these contents of the examples.

Example 1

In Example 1, a polycrystalline silicon film was formed on a mesoporous silica thin film formed on a glass base, and a microphase separation structure of a block copolymer film of a polystyrene-polymethyl methacrylate (PS-b-PMMA) was used. Example 1 was an example in which fine concaves were formed on the surface of the polycrystalline silicon, and the substrate was used as a substrate for SALDI-MS.

A base made of quartz glass of 50 mm×50 mm and 1 mm in thickness was washed with acetone, isopropyl alcohol and pure water, and subjected to the UV-ozone treatment to clean its surface.

A mixed solution prepared by adding 13.8 g of ethanol with 1.80 g of 0.1-M diluted hydrochloric acid was added and vigorously agitated with 20.8 g of tetraethoxysilane to prepare a homogenous solution, and then the resultant solution was heated at 70° C. for 1 h to fabricate a sol.

0.95 g of a block copolymer surfactant PluronicP123 (BASF AG) was dissolved in 1.97 g of ethanol, and the resultant solution was added in 20 g of the sol and added further with 3.95 g of 0.01-M diluted hydrochloric acid to prepare a homogeneous precursor solution.

The homogeneous precursor solution was applied on the above-mentioned base made of quartz glass by the dip coat method and dried in room temperature.

The resultant film was baked in the air at 450° C. for 5 h to remove the surfactant. The film after the removal of the surfactant was transparent and had no cracks observed. The film after baking was evaluated by the X-ray diffractometry, and as a result, a clear diffraction peak was observed at an angle corresponding to d=5.8 nm. Results by a high-resolution scanning electron microscope (FE-SEM), a transmission electron microscope (TEM) and the like revealed that the film had a two-dimensional hexagonal structure formed by honeycomb packing of tubular pores. However, a detailed analysis revealed that since the structural period in the film thickness direction is selectively small, the hexagonal structure deviated from a complete one.

Next, a polycrystalline silicon film was formed on the mesoporous silica thin film. The formation of the polycrystalline silica film was performed under the following conditions using the chemical vacuum deposition (CVD) using a low-temperature plasma.

Flow rate: 100 sccm ($SiH_4$); 9,000 sccm ($H_2$)

| | |
|---|---|
| Pressure: | 2,000 Pa |
| Power: | 200 W |
| Frequency: | 105 MHz |
| Temperature: | 300° C. |

Thus, a polycrystalline silicon film of 200 nm in thickness was fabricated on the mesoporous silica film. The surface of the fabricated polycrystalline silicon film exhibited specular reflexion, and the smoothness of the surface was confirmed by an FE-SEM.

Then, a block copolymer was thinly applied on the polycrystalline silicon film. A diblock copolymer of a polystyrene-polymethyl methacrylate (PS-b-PMMA) (molecular weight ratio=PS 163.5 k:PMMA 67.2 k) was dissolved in the following solvent to prepare a 2-mass % solution.

The solvent was propylene glycol mono-methyl ethyl acetate (PGMEA).

The solution was applied on the polycrystalline silicon film at a rotation frequency of 1,000 rpm by spin coat. The film obtained by spin coat was annealed in vacuum at 180° C. for 1 h for developing a microphase separation structure. The film surface after annealing was observed using the phase mode of an atomic force microscope (AFM), and as a result, a structure was observed in which domains of PMMA were dispersed in a matrix of PS. The observed structure had an average size of the domains of 58.7 nm and an average pitch thereof of 79.9 nm.

Then, from the block copolymer developing the microphase separation structure, one component was selectively removed. This step was performed using the dry etching using oxygen as an etching gas. In Example 1, etching was performed by setting the machine power of the dry etching at 50 W, the bias power at 10 W and the etching time at 60 sec from the film thickness of the block copolymer film and the etching rates of PS and PMMA, which were in advance measured. The block copolymer film after etching was observed by an atomic force microscope (AFM), and as a result, domains of PMMA were observed to be selectively removed.

Then, by using as a mask the polymer film having a large number of holes of the nanometer scale, fine irregularity was formed on the surface of the polycrystalline silicon film. This step was accomplished by the dry etching using $SF_6/CHF_3$ as an etching gas. Also in this case, etching was favorably performed by optimizing the etching conditions as follows in consideration of the film thickness of the remaining PS.

Mixing ratio of $SF_6/CHF_3$:1/5

| | |
|---|---|
| Machine power: | 50 W |
| Bias power: | 10 W |
| Etching time: | 120 sec |

Observation of this film by an AFM and an electron microscope confirmed that concaves of 80 nm in depth were formed on the substrate. The structure was one corresponding to the structure illustrated in FIGS. 1A and 1B. The size and pitch of the concaves substantially coincided with the above-mentioned microphase separation structure. The wall surfaces of the concaves were nearly vertical to the base surface, and the superiority of the directional controllability of etching in the dry etching process was considered to be reflected.

Lastly, the PS slightly remaining on the polycrystalline silicon was removed. The PS was favorably removed using ethyl acetate.

The substrate on which the irregularity was formed was dried in nitrogen gas at 120° C. to provide as a substrate for mass spectrometry. Triacetyl-b-cyclodextrin was used as a sample and silver trifluoroacetate was used as an ionization promoter. The ionization promoter and a 0.1-mM THF solution of the sample were dropped on the substrate and the measurement was conducted after drying in air. The molecular size of triacetyl-b-cyclodextrin is about 2 nm and the molecular weight is 2017.75.

The measurement was conducted using an $N_2$ laser of 377 nm as an excitation light source and a time-of-flight type detector. As a result, by using the substrate fabricated in Example 1, the mass peak of triacetyl-b-cyclodextrin added with $Ag^+$ was clearly observed with a high S/N ratio. No peak corresponding to a mass of a low molecular weight was observed and the suppression of fragmentation was confirmed.

Example 2

Example 2 was an example in which, contrary to Example 1 in which concaves were formed, fine convexes were formed using a microphase separation structure of a block copolymer on a substrate, which was used as a substrate for mass spectrometry.

A mesoporous silica film and a polycrystalline silicon layer were formed on a base made of quartz glass by using the same procedures and same materials as those in Example 1. A diblock copolymer of PS-b-PMMA having a molecular weight ratio of PS 78.0 k:PMMA 169.6 k was formed as a film on the polycrystalline silicon layer by the same procedures as those in Example 1 to develop a microphase separation structure by the same procedure. The film thickness was 80 nm like in Example 1.

The surface of the film was observed by an atomic force microscope (AFM) phase mode, and as a result, a structure was observed in which domains of PS were dispersed in a matrix of PMMA. The observed structure had an average size of the domains of 47.1 nm and an average pitch thereof of 67.9 nm.

The block copolymer film was subjected to the oxygen dry etching to remove the matrix. The conditions of the dry etching were as in Example 1. A state was confirmed in which by this step, PMMA of the matrix was removed and the domains of PS were dotted on the polycrystalline silicon film.

This structure was subjected to the dry etching using $SF_6$/$CHF_3$ as an etching gas under the same conditions as those in Example 1 to remove parts of the silicon layer where PS is not present. By this step, the silicon layer was etched by about 80 nm, and as a result, convexes of 80 nm were formed on the substrate. This structure was one illustrated in FIGS. 2A and 2B.

The size and pitch of the convexes substantially coincided with the above-mentioned domains having the microphase separation structure. The wall surfaces of the convexes were nearly vertical to the base surface and the superiority of the directional controllability of etching of the dry etching process was considered to be reflected.

Lastly, the PS slightly remaining on the polycrystalline silicon film was removed by the same procedure as that in Example 1.

By using the substrate for mass spectrometry thus fabricated on which a large number of fine convexes were formed, the mass spectrometry similar to that in Example 1 was attempted.

As a result, as in Example 1, a peak of a sample was observed with a high S/N ratio, thus verifying a highly sensitive detection of the sample. Further, almost no peak by the fragmentation was observed in the region of low molecular weights.

Example 3

In Example 3, the same block copolymer as that in Example 1 was used and PMMA was selectively removed by the dry etching using oxygen as an etching gas; thereafter a metal was vapor deposited on parts where PMMA had been removed and PS was further removed. Thereafter, the polycrystalline silicon film was etched using the metal as a mask. The substrate for mass spectrometry thus obtained according to the present invention had convexes having a higher aspect ratio than that of the structure of Example 2, and was an example obtained by modifying the surface of a substrate for mass spectrometry.

A film of PS, similar to that formed in Example 1, on which dotted fine holes were formed was formed on the polycrystalline silicon film formed on the mesoporous silica thin film by using the same base material, the same block copolymer and the same procedures as those in Example 1.

Chromium was vapor deposited by 100 nm on the film by the electron beam vapor deposition. The structure with the deposited chromium was immersed in ethyl acetate, heated at 40° C. to dissolve and remove the PS matrix and simultaneously remove the chromium formed on the PS. After this step, the surface of the film thus obtained was observed by an AFM, and as a result, fine dots of chromium like those observed in Example 2 were confirmed to be formed on the polycrystalline silicon film.

Thereafter, the dry etching was performed under the same conditions as those in Example 1 to etch the polycrystalline silicon film. The etching time was set 240 sec, which was longer than that in Examples 1 and 2.

After the etching of the polycrystalline silicon film, the etched polycrystalline silicon film was immersed in an aqueous solution of cerium ammonium nitrate and perchloric acid for 15 sec to etch chromium, fully washed with ultrapure water, and then heated and dried in nitrogen at 120° C.

As a result of observation of this substrate by an AFM, formation of fine convexes as illustrated in FIGS. 2A and 2B were confirmed with the height of the convexes of about 140 nm.

Then, this structure was put in a closed vessel, and exposed to the vapor of n-propyl triethoxysilane for 1 h. By this step, a structure was obtained to which an organic group derived from n-propyl triethoxysilane was bonded. This treatment prevents the decrease in the sensitivity of the mass spectrometry spectrum because the surface of silicon is otherwise oxidized when left in the air, leading to the decrease in the sensitivity.

By using this structure as a substrate for mass spectrometry, the mass spectrometry spectrum was measured under the same conditions as those in Examples 1 and 2. As a result, a sample was detected with high sensitivity as in Examples 1 and 2, and it was revealed that no peak was observed at a low molecular weight region other than a peak possibly due to a slight fragment of the silane coupling agent, thus suppressing the fragmentation. The measured spectrum exhibited a slightly higher S/N ratio than those in Examples 1 and 2 regardless of the same concentration of the sample, thus exhibiting the highly sensitive measurement of the sample.

The substrate after preserved in synthetic air for two months was similarly measured, and the signal/noise ratio and the like of the measured spectrum were not inferior to the substrate immediately after the fabrication.

Example 4

Example 4 was an example in which by using gold as an inorganic material film in place of silicon, and using the phase separation structure of a block copolymer as a mask, a fine irregular structure was formed on the gold film to be applied to a substrate for mass spectrometry.

The same mesoporous silica thin film as that fabricated in Examples 1 to 3 was formed on the base made of quartz glass used in Examples 1 to 3, and gold of 200 nm was vapor deposited on the mesoporous silica thin film by the electron beam deposition. The surface of the gold after the deposition exhibited the specular reflexion, and the result of observation by an FE-SEM revealed the surface having a flat shape.

The same block copolymer as that used in Example 2 was applied on the deposited gold film; a microphase separation structure was developed by the same procedures; and the dry etching was performed using oxygen as an etching gas under the same conditions as those in Examples 1 to 3 to selectively remove the matrix of PMMA. In the state that a large number of PS dots remained on the deposited gold film, chromium was vapor deposited by 100 nm on the PS dots as in Example 3. Then, as in Example 3, the PS was dissolved using ethyl acetate to remove the PS and the chromium formed thereon. By this step, on the deposited gold film, a thin chromium film in which a large number of fine holes were formed was formed. The result of observation of this film by an AFM confirmed that the microphase separation structure of the polymer was completely transferred to the chromium film.

By using as a mask the chromium film having a large number of fine holes, the gold was etched by the dry etching. The dry etching used $CF_4$ as an etching gas, and was performed at a power of 150 W for 5 min. The etching rate of gold with $CF_4$ is three or more times that of chromium, so the gold was favorably etched by using chromium as a mask.

After this step, chromium was removed by etching with the same etchant and under the same etching condition as those used in Example 3. The surface of the gold after etching was observed by an AFM, and as a result, a state was observed in which a large number of fine concaves were formed on the deposited gold film, thus confirming that the phase separation structure of the block copolymer was favorably transferred to the deposited gold film. The depth of fine concaves was about 150 nm.

After this substrate was dried in a nitrogen atmosphere at 120° C., the mass spectrometry as in Examples 1 to 3 was attempted. As a result, as in Examples 1 to 3, it was confirmed that a sample was highly sensitively detected, and that almost no peak due to the fragmentation occurred in the low molecular weight region. Example 4 exhibited that the thin metal film on whose surface the irregularity was formed can also be favorably used as a substrate for measurement by SALDI-MS.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-190418, filed Jul. 11, 2006, which is hereby incorporated by reference herein in its entirety.

What is claimed is:

1. A substrate for mass spectrometry, comprising:
a base;
a mesoporous silica film formed on the base; and
an inorganic material film formed on the mesoporous silica film,
wherein the inorganic material film has a plurality of concaves formed vertically to the base, the diameter of the concaves being not less than 1 nm and less than 1 μm,
wherein the mesoporous silica film has a flat surface and a two-dimensional hexagonal structure formed by honeycomb packing of tubular pores,
wherein the mesoporous silica film gives at least one diffraction peak in an X-ray diffraction profile in an angular region corresponding to a recurrent structure of not less than 1 nm, and
wherein the tubular pores are formed from clusters of surfactant molecules serving as a template, and the pores have a substantially uniform pore size.

2. The substrate for mass spectrometry according to claim 1, wherein an electrically conductive material different from the material comprising the inorganic material film is provided on the concaves.

3. The substrate for mass spectrometry according to claim 1, wherein the inorganic material film is silicon or a metal.

4. The substrate for mass spectrometry according to claim 1, wherein an organic substance different from the substance comprising the inorganic material film is provided on the surface of the inorganic material film.

5. A substrate for mass spectrometry, comprising:
a base;
a mesoporous silica film formed on the base; and
an inorganic material film formed on the mesoporous silica film,
wherein the inorganic material film has a plurality of convexes formed vertically to the base, the diameter of the convexes being not less than 1 nm and less than 1 μm,
wherein the mesoporous silica film has a flat surface and a two-dimensional hexagonal structure formed by honeycomb packing of tubular pores,
wherein the mesoporous silica film gives at least one diffraction peak in an X-ray diffraction profile in an angular region corresponding to a recurrent structure of not less than 1 nm, and
wherein the tubular pores are formed from clusters of surfactant molecules serving as a template, and the pores have a substantially uniform pore size.

6. The substrate for mass spectrometry according to claim 5, wherein an electrically conductive material different from the material comprised in the inorganic material film is provided on the convexes.

* * * * *